United States Patent
Boyette et al.

(10) Patent No.: US 9,667,655 B2
(45) Date of Patent: May 30, 2017

(54) INTELLIGENT CONTENT GHOSTING ON MOBILE DEVICES

(71) Applicant: CA, INC., New York, NY (US)

(72) Inventors: Neil Boyette, Oregon City, OR (US); Jameel Ahmed Kaladgi, Bangalore (IN); Vikas Krishna, San Jose, CA (US)

(73) Assignee: CA, INC., Islandia, NY (US)

( * ) Notice: Subject to any disclaimer, the term of this patent is extended or adjusted under 35 U.S.C. 154(b) by 0 days.

(21) Appl. No.: 14/620,757

(22) Filed: Feb. 12, 2015

(65) Prior Publication Data
US 2016/0241594 A1     Aug. 18, 2016

(51) Int. Cl.
*H04L 29/06*     (2006.01)
*H04W 12/08*     (2009.01)

(52) U.S. Cl.
CPC ............. *H04L 63/20* (2013.01); *H04W 12/08* (2013.01); *H04L 2209/42* (2013.01)

(58) Field of Classification Search
CPC ..... H04L 63/20; H04L 2209/42; H04W 12/08
USPC ........................................................... 726/1
See application file for complete search history.

(56) References Cited

U.S. PATENT DOCUMENTS

| | | | |
|---|---|---|---|
| 7,724,918 B2 | 5/2010 | Balakrishnan et al. | |
| 2010/0122314 A1* | 5/2010 | Zhang | G06F 21/554 |
| | | | 726/1 |
| 2013/0117563 A1* | 5/2013 | Grabelkovsky | G06F 21/6218 |
| | | | 713/165 |

\* cited by examiner

*Primary Examiner* — Kambiz Zand
*Assistant Examiner* — Aubrey Wyszynski
(74) *Attorney, Agent, or Firm* — Sage Patent Group

(57) ABSTRACT

A method includes performing operations as follows on a processor: receiving a request for a content item from a mobile device, determining that the content item is protected by a security policy, the security policy comprising an environmental factor associated with the use of the mobile device, ghosting a portion of the content item based on the security policy, and sending the content item and the security policy to the mobile device.

15 Claims, 7 Drawing Sheets

INTELLIGENT CONTENT GHOSTING ON MOBILE DEVICES

BACKGROUND

The present disclosure relates to computing systems, and, in particular, to security management of mobile devices and improving productivity when using mobile devices and/or applications.

The proliferation of mobile devices can present both opportunities and areas of concern for an enterprise. Because mobile devices may be more susceptible to being stolen, misplaced, or compromised in some way, enterprises may deploy a set of security tools that may provide a security layer around the mobile applications. Mobile Content Management (MCM) tools may provide the ability for a user to securely access, and collaborate on, content stored by an enterprise. As much of an enterprise's content may be considered sensitive or proprietary, an enterprise may adopt policies that include restrictions on accessing certain types of data or files to ensure that sensitive information is not compromised. These restrictions may include operation limitations, geo fence limitations, time of day/week limitations, and access limitations. Other restrictions may include limitations on copying a file to local storage, e.g., a mobile device or desktop computer, for viewing or modification. The policies may also include requirements that various applications and/or other software components, such as operating systems, be upgraded before certain applications and/or data can be used. While such policies have a valid purpose in enhancing the security of mobile devices, the policies may in some instances, negatively impact user productivity, as content that has been deemed sensitive can't be accessed by a user for valid business purposes. Even if only a small part of the content is deemed sensitive, the restrictions are applied to the entire file. As a result, an enterprise may look for ways to boost user productivity and output through use of mobile devices. For example, an enterprise may install content and collaboration tools that can be used to provide a platform for users to securely store and share content.

SUMMARY

In some embodiments of the inventive subject matter, a method comprises performing operations as follows on a processor: receiving a request for a content item from a mobile device, determining that the content item is protected by a security policy, the security policy comprising an environmental factor associated with the use of the mobile device, ghosting a portion of the content item based on the security policy, and sending the content item and the security policy to the mobile device.

In still other embodiments of the inventive subject matter, a method comprises performing operations as follows on a processor: sending a request for a content item from a mobile device to a content server, receiving the content item and a security policy from the content server, the content item having a ghosted portion based on the security policy, the security policy comprising an environmental factor associated with the use of the mobile device, monitoring an operational environment of the mobile device, and displaying the ghosted portion of the content item without ghosting being applied based on the operational environment of the mobile device and the environmental factor.

In still other embodiments of the inventive subject matter, a computer program product comprises a tangible computer readable storage medium comprising computer readable program code embodied in the medium that when executed by a processor causes the processor to perform operations comprising: receiving a request for a content item from a mobile device, determining that the content item is protected by a security policy, the security policy comprising an environmental factor associated with the use of the mobile device, ghosting a portion of the content item based on the security policy, and sending the content item and the security policy to the mobile device.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
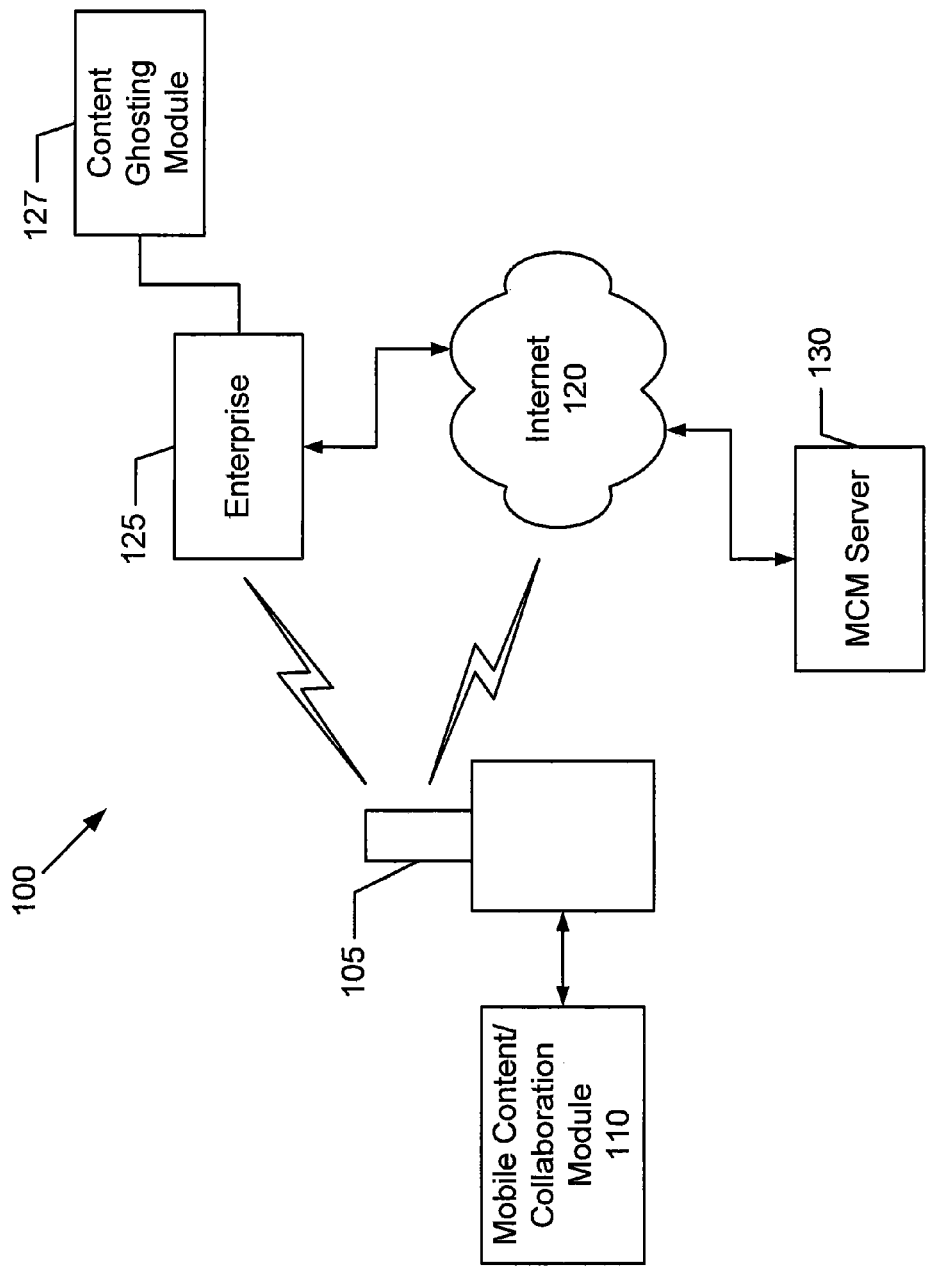
FIG. 1 is a block diagram of a system for facilitating intelligent content ghosting on mobile devices in accordance with some embodiments of the inventive subject matter.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet files, video files, audio files, picture files, and document exchange files.

As used herein, the term "ghosting" or "to ghost" a content item means to obfuscate the content item so that the underlying data and/or information cannot be obtained. For example, when the content item comprises text or graphic data/information, the text or graphic may be blurred or encrypted so that the text or graphic cannot be read/viewed. When the content item comprises audio information, the audio signal may be distorted so that the sound is unintelligible. When the content item comprises video information, the video signal may be distorted so that the picture is unintelligible.

Some embodiments of the inventive subject matter stem from a realization that a Mobile Content Management (MCM) tool may be used to provide a secure platform in which users can use mobile devices to communicate with an enterprise server to access, manage, and collaborate on sensitive content (e.g., content where at least a portion includes confidential information that should not be freely disseminated). The MCM tool strikes a balance between user experience and security by ghosting the portion of a content item containing sensitive data and/or information when the policy determines the content is unsafe for consumption/dissemination, while allowing access to the remainder of the content. An administrator can define a security policy that includes one or more environmental factors, which are used to determine which portions of a content item are deemed sensitive and should be ghosted. These environmental factors include, but are not limited to, time of day, day of the year, geographic location, and type of communication connection used to communicate with the enterprise. A security administrator may also, for example, specify portions of content that are sensitive and should be ghosted using natural language expressions in the security policy. By ghosting portions of a content item, but allowing other portions of a content item to be viewed by a user the productivity of the user may be enhanced, while still providing the desired enterprise security.

FIG. 1 is a block diagram of a system for facilitating intelligent content ghosting on mobile devices in accordance with some embodiments of the inventive subject matter. Employees of an enterprise, for example, may use mobile devices, such as smart phones, tablets, laptops, and the like to access various types of content belonging to the enterprise to do their work. As shown in FIG. 1, a user of a mobile device 105 may communicate with various servers of an enterprise 125 to access content thereon. The enterprise 125 may have numerous servers that are responsible for the various operations of the enterprise and for storing the enterprise content. The particular functional responsibilities and the storage of content can be combined or divided in a variety of ways. Moreover, the enterprise servers may be implemented as separate servers on individual hardware platforms or as virtual servers on a common hardware platform. In addition, the functionality of various servers may be combined in a single server or separated into additional servers in accordance with various embodiments of the inventive subject matter.

Employees of an enterprise may often work in teams or groups and multiple people may wish to provide input and/or comment on various content that the group or team is working on. The Mobile Content Management (MCM) server 130 may download a mobile content/collaboration module 110 to mobile device 105 and may download a content ghosting module 127 to the enterprise 125 server(s). The mobile content/collaboration module 110 and content ghosting module 127 may facilitate intelligent content ghosting to ensure that sensitive and/or confidential information belonging to the enterprise is not placed at undue risk when accessed via a mobile device, while ensuring that other data/information is still accessible to users via a mobile device. The content ghosting module 127 is configured to respond to requests for content items from mobile devices, such as requests for content generated by the mobile content/collaboration module 110. Because mobile devices may post greater risks due to their susceptibility to being stolen, misplaced, or compromised through unsecure communication connections, the content ghosting module 127 may ghost portion(s) of a requested content item based on one or more security policies defined, for example, by an administrator before providing access to the requested content item to the user of the mobile device. According to some embodiments of the inventive subject matter, the content ghosting module 127 sends the requested content item with at least a portion of the content item ghosted based on the security policy/policies to the mobile device 105. In addition, the content ghosting module 127 sends the security policy/policies used in determining the portion(s) of the content item that were ghosted to the mobile device 105 along with the content item. Because the security policies comprise one or more environmental factors that affect whether portion(s) of the content item are to be ghosted, when the environmental conditions of the mobile device 105 change, the mobile content/collaboration module 110 may remove some or all of the ghosting of the content item to reveal the underlying data and/or information based on the restrictions defined in the security policy/policies.

As shown in FIG. 1, the connections between the enterprise 125, MCM server 130, and the mobile device 105 may include wireless and/or wireline connections and may be direct or include one or more intervening local area networks, wide area networks, and/or the Internet. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks.

Although FIG. 1 illustrates a system for facilitating intelligent content ghosting on mobile devices according to some embodiments of the inventive subject matter, it will be understood that embodiments of the present invention are not limited to such configurations, but are intended to encompass any configuration capable of carrying out the operations described herein.

Figure 2:
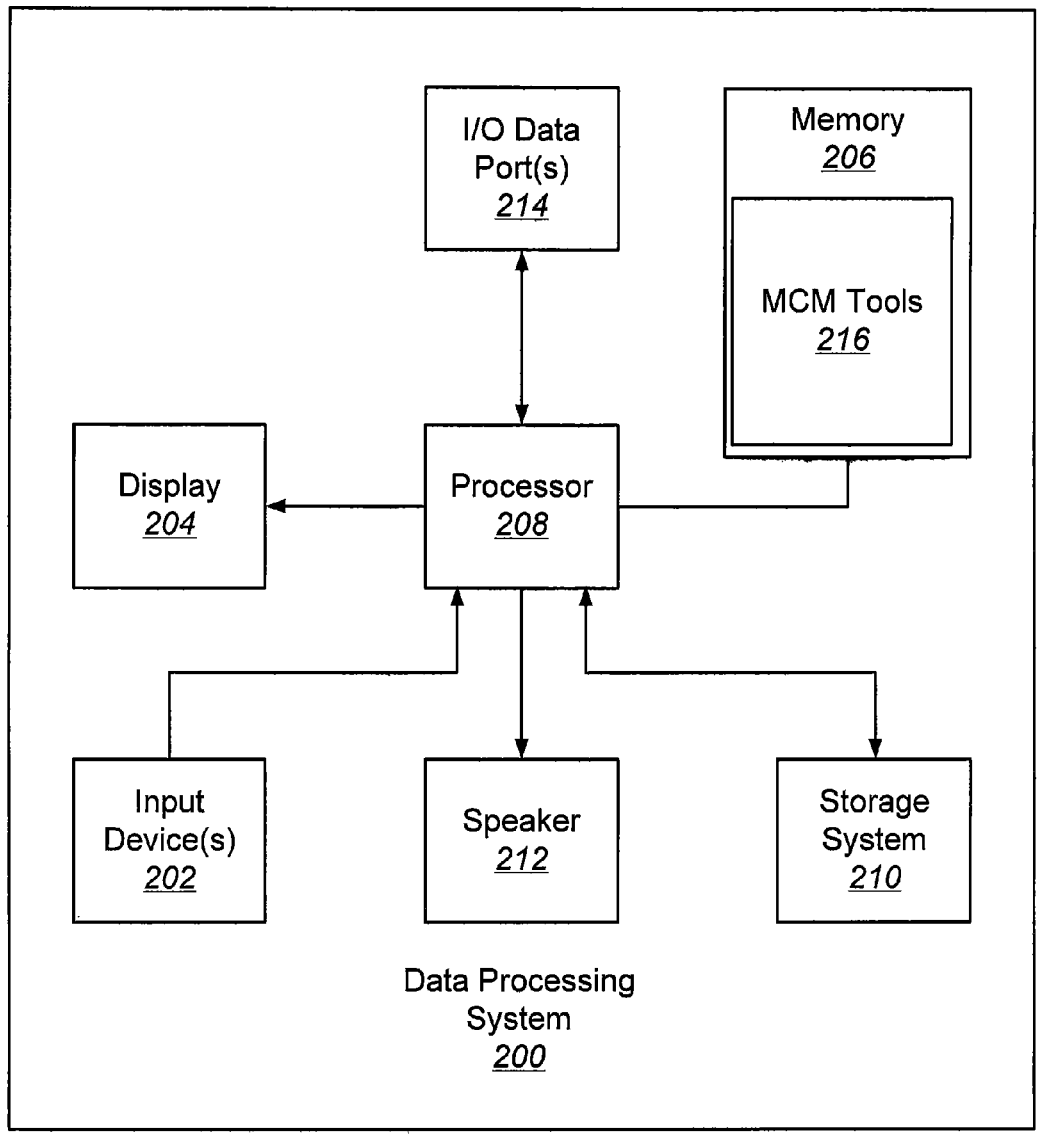
FIG. 2 illustrates a data processing system that may be used to implement the Mobile Content Management (MCM) server of FIG. 1 in accordance with some embodiments of the inventive subject matter.

Referring now to FIG. 2, a data processing system 200 that may be used to implement the MCM server 130 of FIG. 1, in accordance with some embodiments of the inventive subject matter comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, flash drives, USB drives, hard disks, or the like, as well as virtual storage, such as a RAMDISK or cloud storage. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a MCM tools module 216 that may be configured to provide the mobile content/collaboration module 110 and the content ghosting module 127 of FIG. 1 according to some embodiments of the inventive subject matter.

Figure 3:
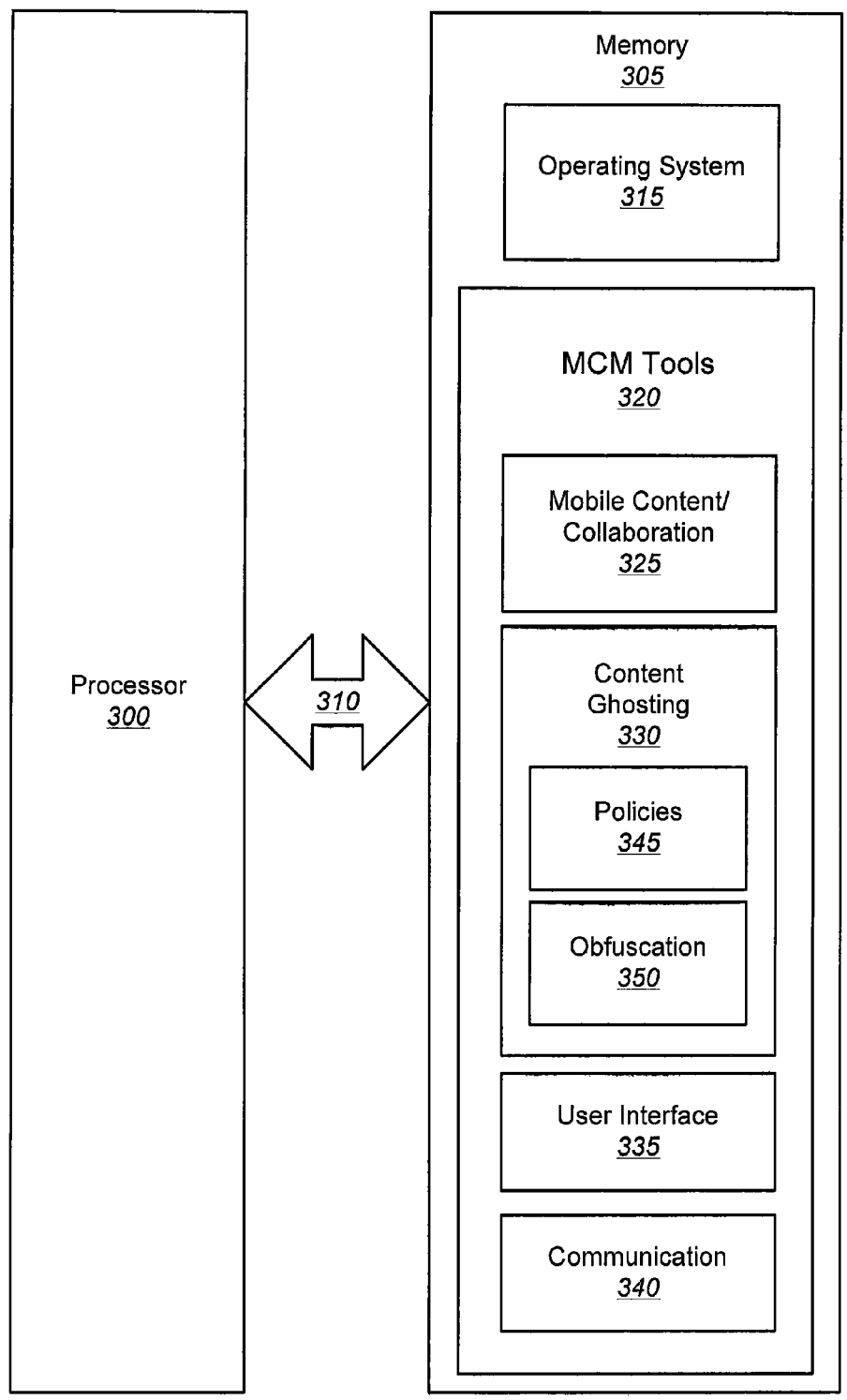
FIG. 3 is a block diagram that illustrates a software/hardware architecture for the MCM server of FIG. 1 in accordance with some embodiments of the present inventive subject matter.

FIG. 3 illustrates a processor 300 and memory 305 that may be used in embodiments of data processing systems, such as the MCM server 130 of FIG. 1 and the data processing system 200 of FIG. 2, respectively, for facilitating intelligent content ghosting on mobile devices according to some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for facilitating intelligent content ghosting on mobile devices in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a MCM tools module 320. In particular, the operating system 315 may manage the data processing system's software and/or hardware resources and may coordinate execution of programs by the processor 300. The MCM tools module 320 may comprise a mobile content/collaboration module 325, a content ghosting module 330, a user interface module 335, and a communication module 340. The mobile collaboration module 325 corresponds to the mobile content/collaboration module 110 of FIG. 1 and the content ghosting module 330 corresponds to the content ghosting module 127 of FIG. 1. As described above, the content ghosting module 330 is configured to respond to requests for content items from mobile devices, such as requests for content generated by the mobile content/collaboration module 110 from the mobile device 105. The content ghosting module 330 may ghost portion(s) of a requested content item based on one or more security policies 345. These security policies 345 may be defined, for example, by an administrator using the user interface 335. The obfuscation module 350 may be configured to ghost the portion(s) of the content item as dictated by the security policy/policies 345). A variety of ghosting techniques can be used including, but not limited to, encryption, blurring or covering up of text, graphics, or images, distortion of audio/video signals, and the like. The obfuscation module 350 may analyze a content item to search for portions that are implicated by a security policy/policies. In some embodiments, an administrator or other entity may annotate content item(s) to place markers, such as metadata tags or labels, to identify portions of the content items that may be sensitive and covered by one or more security policies. Other types of delimiters can be used to segment portions of audio or video files to identify sensitive portions of content.

The communication module 340 may be configured to facilitate communication between the MCM server 130 and other entities, such as the mobile device 105 and the enterprise 125.

Although FIG. 3 illustrates hardware/software architectures that may be used in data processing systems, such as the MCM server 130 of FIG. 1 and the data processing system 200 of FIG. 2, respectively, for facilitating intelligent content ghosting according to some embodiments of the inventive subject matter, it will be understood that the present invention is not limited to such a configuration but is intended to encompass any configuration capable of carrying out operations described herein.

Figure 4:
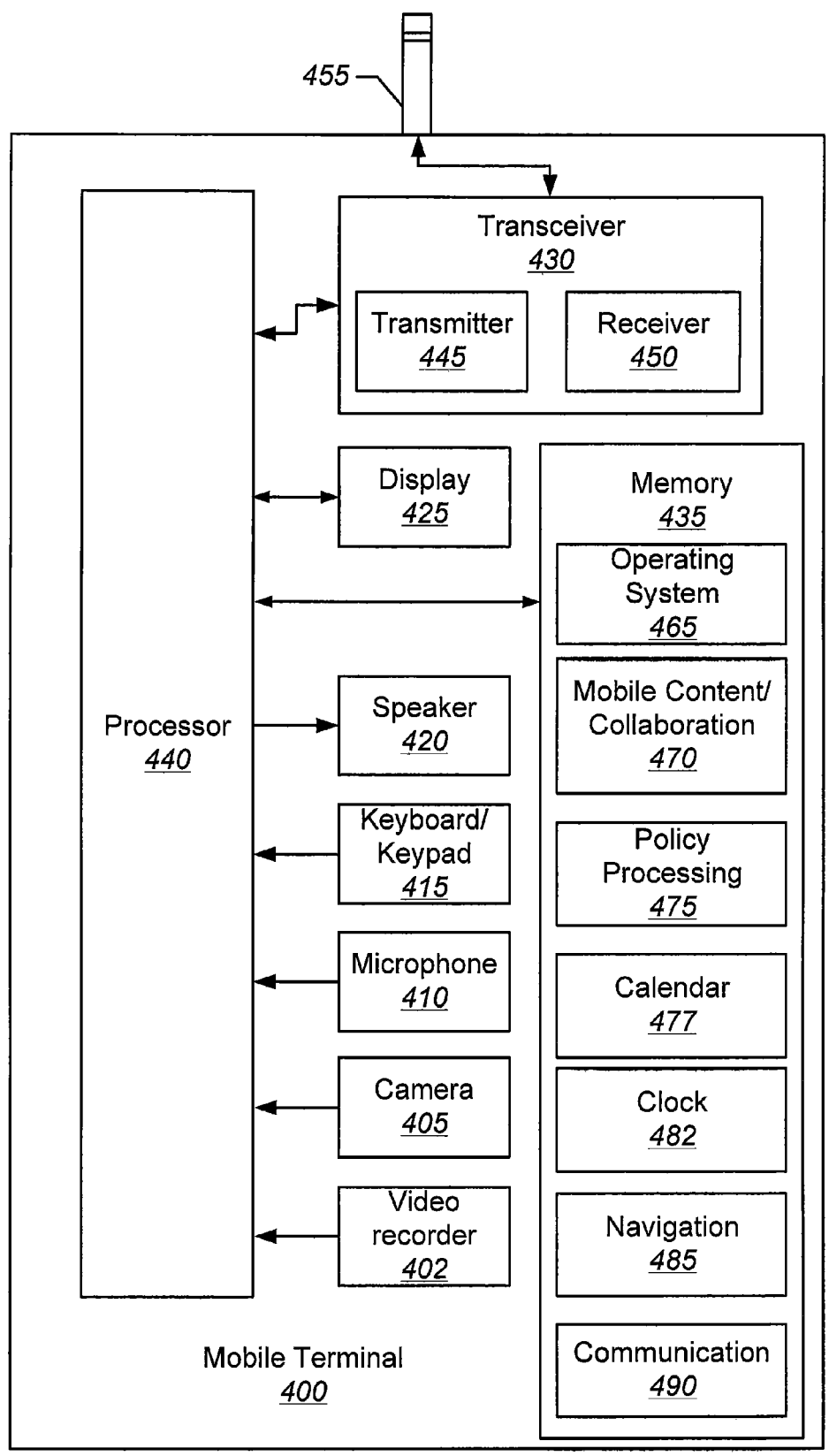
FIG. 4 is a block diagram that illustrates an electronic device/mobile terminal in accordance with some embodiments of the present inventive subject matter.

Referring now to FIG. 4, an exemplary mobile terminal 400 that may be used to implement the mobile terminal 105 of FIG. 1, in accordance with some embodiments of the inventive subject matter, includes a video recorder 402, a camera 405, a microphone 410, a keyboard/keypad 415, a speaker 420, a display 425, a transceiver 430, and a memory 435 that communicate with a processor 440. The transceiver 430 comprises a transmitter circuit 445 and a receiver circuit 450, which respectively transmit outgoing radio frequency signals to base station transceivers and receive incoming radio frequency signals from the base station transceivers via an antenna 455. The radio frequency signals transmitted between the mobile terminal 400 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 400 may be included in many conventional mobile terminals and their functionality is generally known to those skilled in the art.

The processor 440 communicates with the memory 435 via an address/data bus. The processor 440 may be, for example, a commercially available or custom microprocessor. The memory 435 is representative of the one or more memory devices containing the software and data used to facilitate intelligent content ghosting in accordance with some embodiments of the present invention. The memory 435 may include, but is not limited to, the following types of devices: cache, ROM, PROM, EPROM, EEPROM, flash, SRAM, and DRAM.

As shown in FIG. 4, the memory 435 may contain up to seven or more categories of software and/or data: an operating system 465, a mobile content/collaboration module 470, a policy processing module 475, a calendar module 477, a clock module 482, a navigation module 485, and a communication module 490.

The operating system 465 generally controls the operation of the mobile terminal 400. In particular, the operating system 465 may manage the mobile terminal's software and/or hardware resources and may coordinate execution of programs by the processor 440. The mobile content/collaboration module 470 corresponds to the mobile content/collaboration module 110 of FIG. 1, which has been described above.

As described above, when the mobile device 105 requests a content item from the enterprise the content ghosting module 127 may send the requested content item with at least a portion of the content item ghosted based on the security policy/policies 345 to the mobile device 105. In addition, the content ghosting module 127 sends the security policy/policies used in determining the portion(s) of the content item that were ghosted to the mobile device 105 along with the content item. The policy processing module 475 may be configured to process the security policy/policies associated with a ghosted content item to evaluate whether the ghosted portions should remain ghosted in light of a current environmental status of the mobile device. The security policy may comprise one or more environmental factors used to determine which portions of a content item to ghost. These environmental factors include, but are not limited to, time of day information that can be obtained through the clock module 482, day of the year information that can be obtained through the calendar module 477, geographic location information that can be obtained through the navigation module 485, and type of communication connection used to communicate with the enterprise that can be obtained from the communication module 490. As the use environment for the mobile terminal/device 400 changes, the policy processing module 475 may collect updated information on the environmental factors used in the security policy to ghost one or more portions of the content item and, if appropriate, may remove some or all of the ghosting of the content item to reveal the underlying data and/or information based on the restrictions defined in the security policy/policies.

The communication module 490 may be configured to facilitate communication between the mobile terminal 105/400 and other entities, such as the enterprise 125 and MCM server 130.

Although FIG. 4 illustrates an exemplary software and hardware architecture that may be used for facilitating intelligent content ghosting on mobile devices according to some embodiments of the inventive subject matter, it will be understood that embodiments of the present invention are not limited to such a configuration, but are intended to encompass any configuration capable of carrying out the operations described herein.

Computer program code for carrying out operations of data processing systems discussed above with respect to FIGS. 1-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the MCM server 130, data processing system 200, hardware/software architecture of FIG. 3, enterprise 125 servers and mobile device 105/400 of FIGS. 1 and 4 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Figure 5:
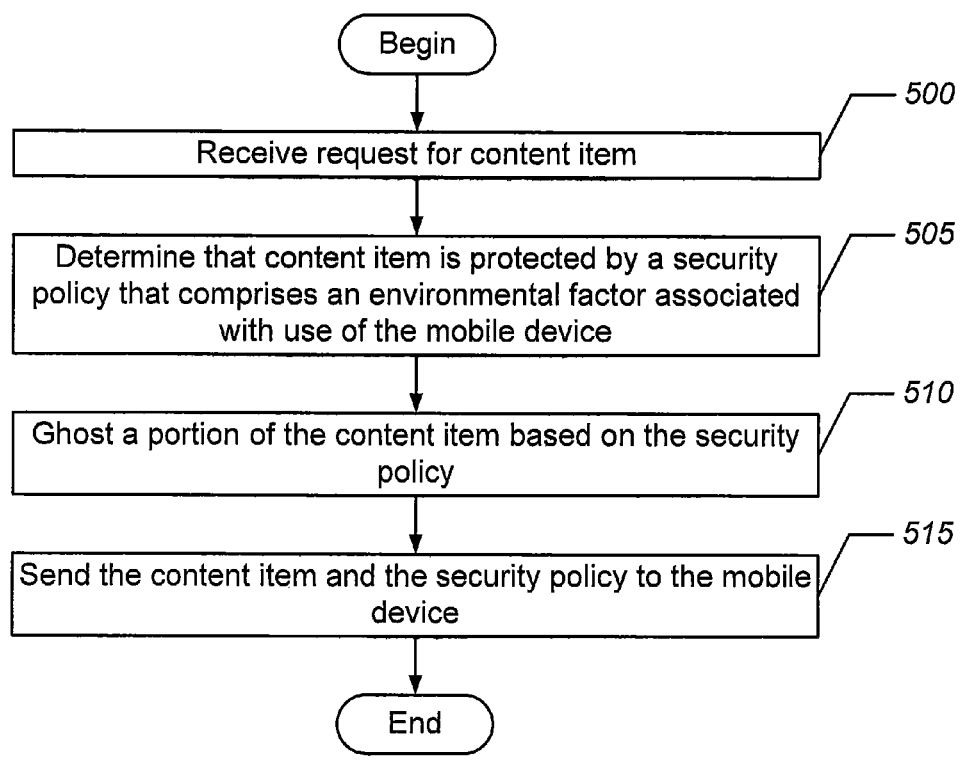
FIGS. 5 and 6 are flowcharts that illustrate operations for facilitating intelligent content ghosting in accordance with some embodiments of the inventive subject matter.
Figure 6:
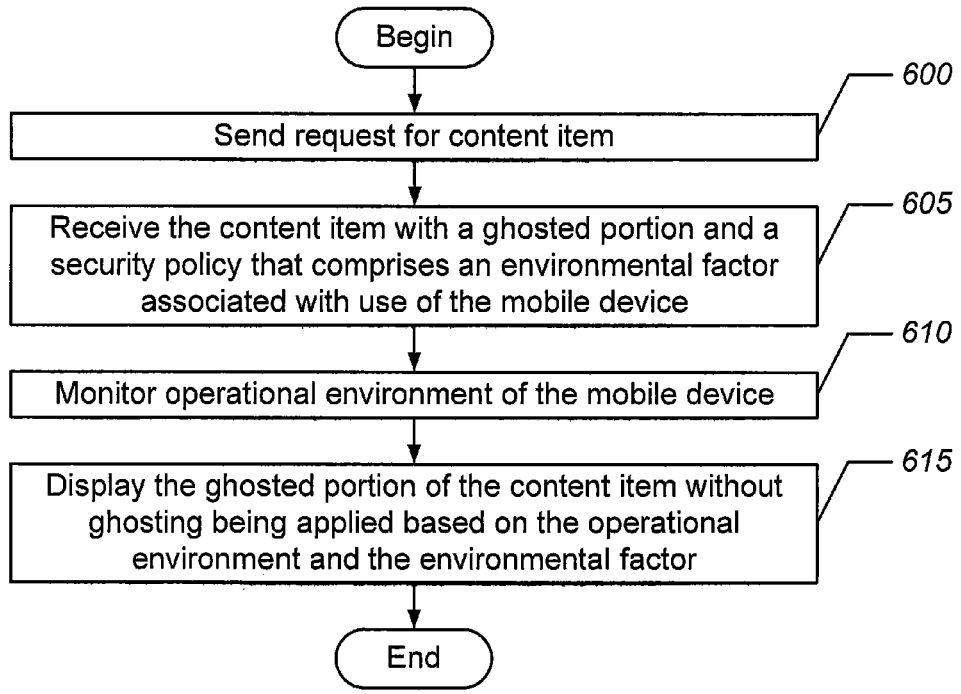

FIGS. 5 and 6 are flowcharts that illustrate operations for facilitating intelligent content ghosting on mobile devices in accordance with some embodiments of the inventive subject matter. Referring to FIG. 5, operations begin at block 500 where the content ghosting module 127 receives a request from the mobile content/collaboration module 110 of the mobile device 105 for a content item. The content ghosting module 127 determines that the content item is protected by one or more security policies, which comprise one or more environmental factors associated with use of the mobile device 105. The environmental factors may include, but are not limited to, time of day information, day of the year information, geographic location information, and type of communication connection used to communicate with the enterprise (e.g., is the connection over a secure network with a security protocol/encryption protocol governing the transmissions, a public network, a public Wi-Fi network, etc.). These factors may be indicative of environments that may pose security risks. For example, an enterprise may not allow certain enterprise information to be accessed from particular countries, states, etc. An enterprise may not allow certain enterprise information to be accessed on weekends or at night or before a certain event occurs (e.g., product release announcement). An administrator may also specify in the security policy certain portions of the content or types of content that should be ghosted using natural language expressions. For example, the administrator may specify that social security data/information should be ghosted or medical record data/information should be ghosted.

Figure 7A:
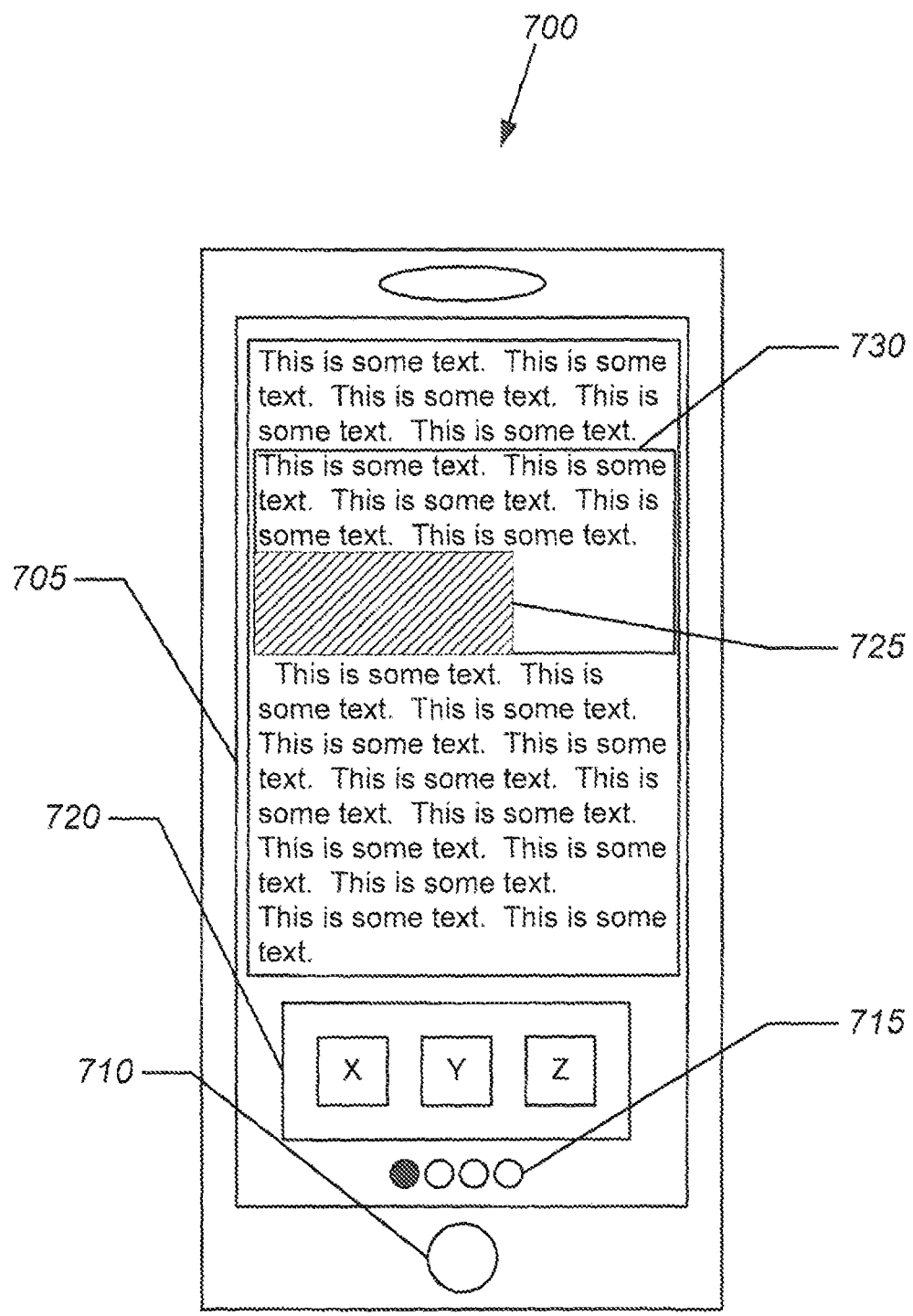
FIGS. 7A and 7B are plan views of an electronic device/mobile terminal that illustrate intelligent content ghosting on a display in accordance with some embodiments of the inventive subject matter.
Figure 7B:
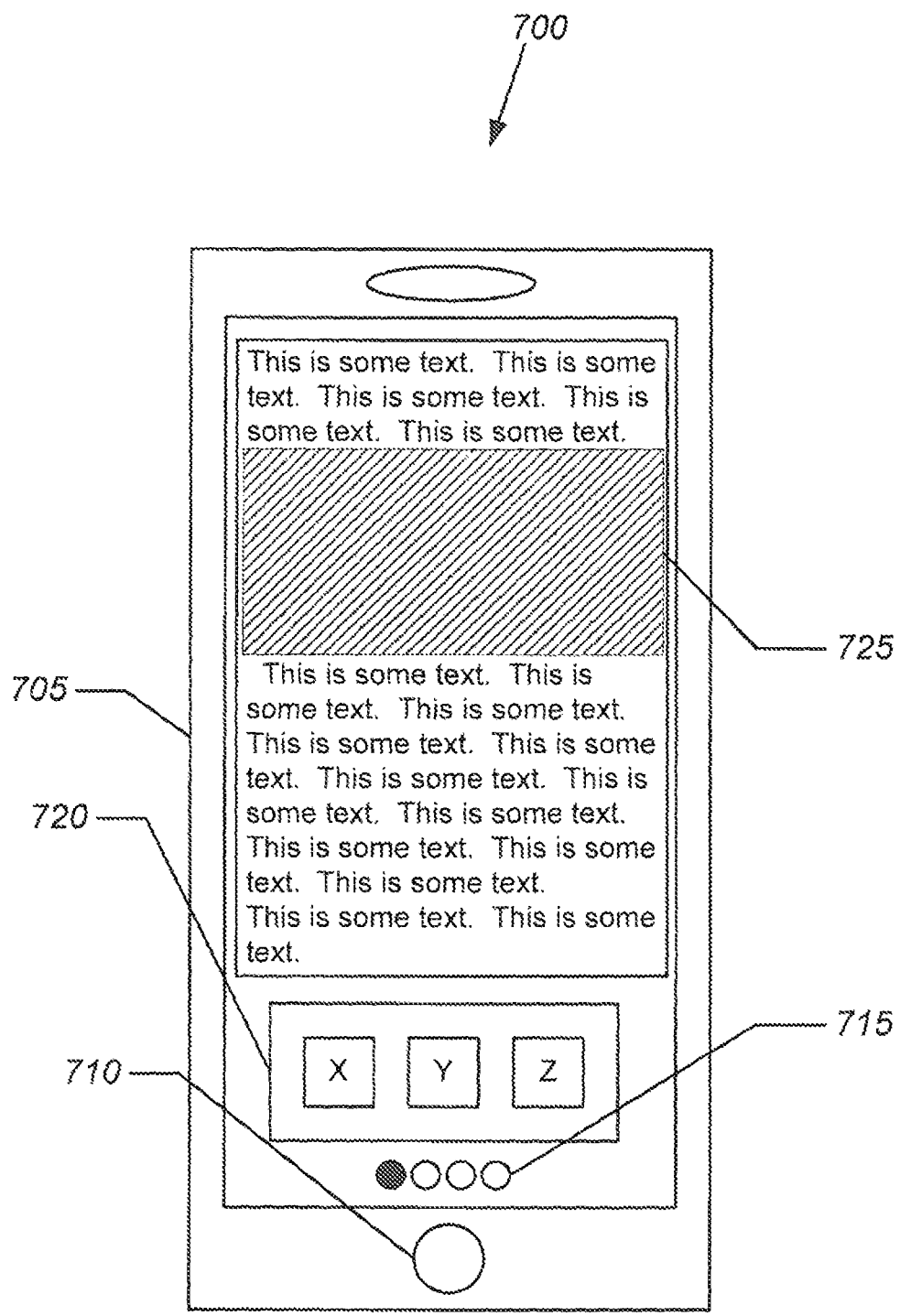

At block 510, the content ghosting module 127 ghosts at least a portion of a content item based on the one or more security policies. FIG. 7A illustrates a mobile device in which a portion of a content item has been ghosted according to some embodiments of the inventive subject matter. As shown in FIG. 7A, the mobile device 700 device comprises a display 705 comprising multiple pages as represented by the page icon 715 where the particular circle highlighted represents a particular page currently being displayed. The mobile device 700 includes a home button 710 that can be invoked to return the user interface page one of the display 705, which may be considered a home page that the mobile device 700 displays when powered on or when awakened from a sleep or inactive state. The user interface may further include a static display portion 720, which remains displayed on all pages of the user interface. As shown in FIG. 7A, icons corresponding to applications X, Y, and Z are assigned to the static display portion 720. One of the icons X-Z may be used to invoke the mobile content/collaboration module 110, for example. Based on a security policy associated with the particular content item shown in the display 705, a portion 725 has been ghosted to obscure the underlying data/information. Even though the portion 725 is unreadable to a user of the mobile device 700, the portion 730 of the content item includes text that is proximal to the ghosted portion 725. It is possible that this proximal text may provide sufficient context for a user to determine some of the underlying ghosted data/information 725. In some embodiments of the inventive subject matter, an administrator may define a proximity surrounding a portion of content to be ghosted that may also be ghosted to reduce the likelihood of a user of a mobile device of determining the underlying data/information that has been ghosted based on context obtained from surrounding portions of the content item. This is illustrated, for example, in FIG. 7B where the unghosted part of portion 730 proximal to the ghosted portion 725 from FIG. 7A has been ghosted to create an enlarged ghosted portion 725 that encompasses the original ghosted portion 725 of FIG. 7A along with a portion of the content item proximal to the original ghosted portion 725 of FIG. 7A.

Returning to FIG. 5, the content ghosting module 127 sends the content item with one or more portions ghosted as described above to the mobile device 105 along with one or more security policies used in determining which portions of the content item were to be ghosted.

As described above, because the security policies comprise one or more environmental factors that affect whether portion(s) of the content item are to be ghosted, when the environmental conditions of the mobile device 105 change, the mobile content/collaboration module 110 may remove some or all of the ghosting of the content item to reveal the underlying data and/or information based on the restrictions defined in the security policy/policies. Referring now to FIG. 6, operations of a mobile device 105 begin at block 600 where the mobile content/collaboration module 110 sends a request to the enterprise 125 for a content item. The mobile device 105 receives the content item with at least a portion of the content item ghosted based on one or more security policies comprising one or more environmental factors associated with use of the mobile device at block 605 as described above with respect to FIG. 5. The mobile content/collaboration module 110 may monitor the operational environment of the mobile device 105 at block 610. As the operational environment for the mobile 105 changes, the mobile content/collaboration module 110 may collect updated information on the environmental factors used in the security policy to ghost one or more portions of the content item and, if appropriate, may remove some or all of the ghosting of the content item to reveal the underlying data and/or information based on the restrictions defined in the security policy/policies at block 615

Embodiments of the present inventive subject matter may provide a mobile content/collaboration module for mobile devices and a content ghosting module for enterprise server(s) that can cooperate to enforce data/information security when users request access to enterprise content using mobile devices.

In some embodiments, an administrator may define one or more security policies that the enterprise server can use to determine what data/content is deemed sensitive or confidential and to what extent the data/information should be protected. For example, an administrator may specify in a security policy using a natural language expression that social security numbers are to remain confidential in all circumstances. The policy may also include some environmental restrictions, such as data/information pertaining to a particular project cannot be viewed unless the mobile device is connected to the enterprise via a secure network connection that enforces a particular encryption standard for communications. The content ghosting module on the enterprise server may apply a security policy to a requested content item to ghost out one or more portions of the content item before sending the content item and the security policy/policies to the requestor's mobile device. In some embodiments, an administrator may define a boundary around sensitive content implicated by a security policy that captures portions of the content item within a defined proximity of a portion of the content item to be ghosted. This additional portion of the content item within the defined proximal boundary may also be ghosted to ensure that users cannot infer the content based on its context.

An administrator may define multiple environmental factors that can be used in a security policy to determine what data/information is sensitive and should be ghosted. These environmental factors include, but are not limited to, time of day, day of the year, geographic location, and type of communication connection used to communicate with the enterprise.

Embodiments of the inventive subject matter may be illustrated by way of example. A user may request an enterprise document from an enterprise server 125 via the mobile content/collaboration module 110 running on a mobile device 105. The request is made while the user is in a coffee shop on a public Wi-Fi network connection. A security policy associated with the document indicates that information related to Project A cannot be viewed via unsecure networks. As a result, the content ghosting module 127 ghosts the information related to Project A in the document while leaving other information related to Project B visible. The ghosted document is sent to the user's mobile device 105 where the user is able to review the Project B information in the coffee shop. The user later travels with the mobile device to a secure environment where the user is able to access the enterprise via a secure network connection. The mobile content/collaboration module 110 detects the change in operational status of the mobile device and removes the ghosting applied to the Project A data/information thereby allowing the user to view the entire document.

Embodiments of the present inventive concept may, therefore, allow for improved user productivity by denying access only to selected portion(s) of a content item deemed sensitive or confidential based on defined security policies as opposed to denying access to the entire content item. This allows the user to view the data/information via the mobile device deemed safe under current operational conditions. When these operational conditions change for the mobile device such that the security requirements associated with a particular ghosted portion of the content item are now satisfied, the ghosting can be removed allowing the user access to the previously protected portions.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit" "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
   performing operations as follows on a processor:
   sending a request for a content item from a mobile device to a content server;
   receiving the requested content item and a security policy from the content server, the content item having a ghosted portion based on the security policy, the security policy comprising an environmental factor associated with use of the mobile device;
   monitoring an operational environment of the mobile device; and
   displaying the ghosted portion of the content item without ghosting being applied based on the operational environment of the mobile device and the environmental factor.

2. The method of claim 1, wherein the environmental factor comprises a day of a year obtained from a calendar module.

3. The method of claim 1, wherein the environmental factor comprises a time of day obtained from a clock module.

4. The method of claim 1, wherein the environmental factor comprises a geographic location obtained from a navigation module.

5. The method of claim 1, wherein the environmental factor comprises a day of a year obtained from a calendar module, a time of day obtained from a clock module, a geographic location obtained from a navigation module, and a type of communication connection used in receiving the request for the content item from the mobile device.

6. A system, comprising:
   a processor; and
   a memory coupled to the processor and comprising computer readable program code embodied in the memory that when executed by the processor causes the processor to perform operations comprising:
   sending a request for a content item from a mobile device to a content server;
   receiving the requested content item and a security policy from the content server, the content item having a ghosted portion based on the security policy, the security policy comprising an environmental factor associated with use of the mobile device;
   monitoring an operational environment of the mobile device; and
   displaying the ghosted portion of the content item without ghosting being applied based on the operational environment of the mobile device and the environmental factor.

7. The system of claim 6, wherein the environmental factor comprises a day of a year obtained from a calendar module.

8. The system of claim 6, wherein the environmental factor comprises a time of day obtained from a clock module.

9. The system of claim 6, wherein the environmental factor comprises a geographic location obtained from a navigation module.

10. The system of claim 6, wherein the environmental factor comprises a day of a year obtained from a calendar module, a time of day obtained from a clock module, a geographic location obtained from a navigation module, and a type of communication connection used in receiving the request for the content item from the mobile device.

11. A computer program product, comprising:
   a non-transitory computer readable storage medium comprising computer readable program code embodied in the medium that when executed by a processor causes the processor to perform operations comprising:
   sending a request for a content item from a mobile device to a content server;
   receiving the requested content item and a security policy from the content server, the content item having a ghosted portion based on the security policy, the security policy comprising an environmental factor associated with use of the mobile device;
   monitoring an operational environment of the mobile device; and
   displaying the ghosted portion of the content item without ghosting being applied based on the operational environment of the mobile device and the environmental factor.

12. The computer program product of claim 11, wherein the environmental factor comprises a day of a year obtained from a calendar module.

13. The computer program product of claim 11, wherein the environmental factor comprises a time of day obtained from a clock module.

14. The computer program product of claim 11, wherein the environmental factor comprises a geographic location obtained from a navigation module.

15. The computer program product of claim 11, wherein the environmental factor comprises a day of a year obtained from a calendar module, a time of day obtained from a clock module, a geographic location obtained from a navigation module, and a type of communication connection used in receiving the request for the content item from the mobile device.

* * * * *